US008041885B2

(12) United States Patent
Jo et al.

(10) Patent No.: US 8,041,885 B2
(45) Date of Patent: Oct. 18, 2011

(54) MEMORY SYSTEM AND METHOD WITH FLASH MEMORY DEVICE

(75) Inventors: Sung-Kyu Jo, Yongin-si (KR);
Jin-Hyoung Kwon, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 664 days.

(21) Appl. No.: 12/144,221

(22) Filed: Jun. 23, 2008

(65) Prior Publication Data

US 2008/0320204 A1 Dec. 25, 2008

(30) Foreign Application Priority Data

Jun. 22, 2007 (KR) .................. 10-2007-0061688

(51) Int. Cl.
*G06F 12/00* (2006.01)
(52) U.S. Cl. .................. 711/103; 711/E12.008
(58) Field of Classification Search .................. None
See application file for complete search history.

(56) References Cited

U.S. PATENT DOCUMENTS

| | | | | |
|---|---|---|---|---|
| 5,369,754 | A * | 11/1994 | Fandrich et al. | 711/103 |
| 6,195,720 | B1 * | 2/2001 | Abiven et al. | 710/310 |
| 6,882,568 | B2 * | 4/2005 | Shiota et al. | 365/185.08 |
| 2005/0083755 | A1 * | 4/2005 | Choi | 365/222 |
| 2006/0065746 | A1 * | 3/2006 | Hakushi et al. | 235/492 |
| 2007/0033348 | A1 * | 2/2007 | Oh | 711/149 |
| 2007/0047308 | A1 * | 3/2007 | Mitsunaga et al. | 365/185.12 |
| 2007/0136536 | A1 * | 6/2007 | Byun et al. | 711/149 |

FOREIGN PATENT DOCUMENTS

| | | |
|---|---|---|
| JP | 08-212019 | 8/1996 |
| KR | 94-24593 | 11/1994 |
| KR | 97-703563 | 7/1997 |

* cited by examiner

*Primary Examiner* — Reginald Bragdon
*Assistant Examiner* — Aracelis Ruiz
(74) *Attorney, Agent, or Firm* — Volentine & Whitt, PLLC

(57) ABSTRACT

A memory system is provided which includes a host, a flash memory device, and a dual port memory which exchanges data with the host and the flash memory device. The flash memory device utilizes a portion of the dual port memory as a working memory.

20 Claims, 6 Drawing Sheets

MEMORY SYSTEM AND METHOD WITH FLASH MEMORY DEVICE

PRIORITY CLAIM

A claim of priority under 35 U.S.C. §119 is made to Korean Patent Application No. 10-2007-0061688, filed Jun. 22, 2007, the entire contents of which are hereby incorporated by reference.

SUMMARY

Secure digital (SD) cards and multimedia cards (MMC), which include flash memory devices, have recently become quite popular. MMC's in particular are designed to cover a wide range of applications such as smart phones, cameras, personal digital assistants (PDA), digital recorders, MP3 players, pagers, and so on. Characteristics of MMC's include high mobility and high performance at relatively low cost. Additional characteristics include low power consumption and a large amount of data processing in a memory card interface.

According to an aspect of the present invention, a memory system is provided which includes a flash memory device, and a dual port memory which exchanges data with the flash memory device. The flash memory device utilizes a portion of the dual port memory as a working memory.

According to another aspect of the present invention, a memory system is provided which includes a host, a flash memory device, and a dual port memory which exchanges data with the host and the flash memory device. The flash memory device utilizes a portion of the dual port memory as a working memory.

According to still another aspect of the present invention, an operating method of a flash memory device in a memory system is provided. The memory system includes a host and a flash memory device which communicate through a dual port memory. To operating method includes reading working memory information, and accessing a portion of the dual port memory as working memory according to the working memory information.

According to yet another aspect of the present invention, an operating method of a memory system including a host and a flash memory device is provided, wherein the host and the flash memory device communicate through a dual port memory. The operating method includes reading first working memory information, setting a portion of the dual port memory as a working memory according to the first working memory information, loading a boot code from the flash memory device into the dual port memory, executing the boot code by the host, and limiting access by the host to the working memory portion of the dual port memory according to second working memory information in the boot code.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF EMBODIMENTS

Hereinafter, exemplary embodiments of the present invention will be described in detail with reference to the accompanying drawings.

Figure 1:
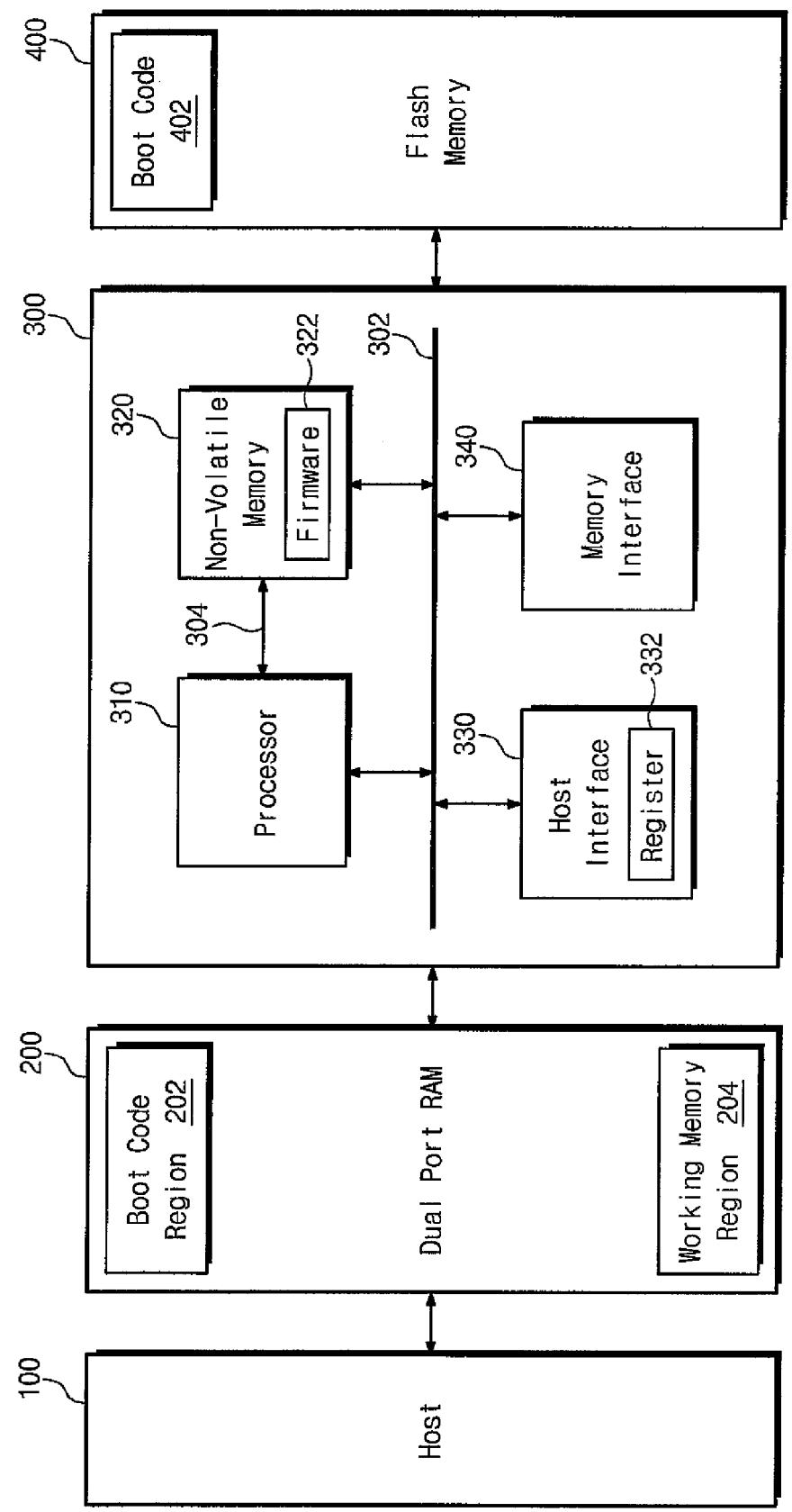
FIG. 1 is a block diagram illustrating a memory system according to an embodiment of the present invention.

FIG. 1 is a block diagram illustrating a memory system according to an embodiment of the present invention.

Referring to FIG. 1, the memory system of this example includes a host 100, a dual port random access memory (RAM) 200, a memory controller 300, and a flash memory 400. The memory system of FIG. 1 may be utilized in many diverse applications, including, for example, mobile phones, MP3 players, personal digital assistants (PDA), portable multimedia players PMP), personal computers, and digital cameras. The host 100 may, for example, be the computer core or central processing unit (CPU) of such application devices.

The dual port RAM 200 is connected to the host 100 through a first port (not shown), and is connected to a second port (not shown). The memory controller 300 communicates with the host 100 through the dual port RAM 200. The dual port RAM 200 may, for example, be a dual port dynamic random access memory (DRAM).

The memory controller 300 of this example includes a processor 310, a non-volatile memory 320, a host interface 330, and a memory interface 340, all of which are connected to a bus 302. Further, the processor 310 and the non-volatile memory 320 may communicate over a communication link 304. In addition to the components illustrated by way of example in FIG. 1, the memory controller 300 may further include a general purpose input/output (GPIO), a timer, an interrupt controller, a bus arbiter, a general direct memory access (GDMA), an error correction code (ECC) circuit, and other components.

The non-volatile memory 320 may, for example, be a read only memory (ROM), a NOR flash memory, or a static random access memory. In this embodiment, the non-volatile memory 320 stores firmware 322 and working memory information. The firmware 322 resides in the non-volatile memory 320, and is executed by the processor 310 when power is applied. The firmware 322 remains executable even after a system is initialized, and supports a basic system operation. The firmware 322 stored in the non-volatile memory 320 loads a boot code 402, which is stored in the flash memory 400 that will be described in more detail later, into the dual port RAM 200 in order to provide a stable mechanism for booting the host 100.

During power up, the processor 310 executes the firmware 322 stored in the non-volatile memory 320 to initialize components of the memory controller 300 and to control general operations of the memory controller 300. Furthermore, during power up, the processor 310 reads the working memory information from the non-volatile memory 320 and stores it in a register 332 of the host interface 330.

The host interface 330 includes the register 332 and is for interfacing with the host 100 or the dual port RAM 200. The host interface 330 references the working memory information stored in the register 332 under control of the processor 310, and then accesses a part of the dual port RAM 200 as a working memory. The working memory information includes information such as the size, position, and/or starting address of the working memory in the dual port RAM 200.

The memory controller 300 temporarily stores data in the working memory. The data is transmitted from the host 100 to be programmed in the flash memory 400, or the data is read from the flash memory 400 to be transmitted to the host 100. Additionally, running variable, temporary data, and swap data, which are generated while the processor 310 is executed, may be stored in the working memory.

The memory controller 300 according to this embodiment utilizes a part of a memory region in the dual port RAM 200 as the working memory. Accordingly, a circuit structure of the memory controller 300 may be simplified and the chip size thereof may be reduced. Moreover, the size of the working memory in the dual port RAM 200 may be readily adjusted by changing the working memory information stored in the non-volatile memory 320.

Figure 2:
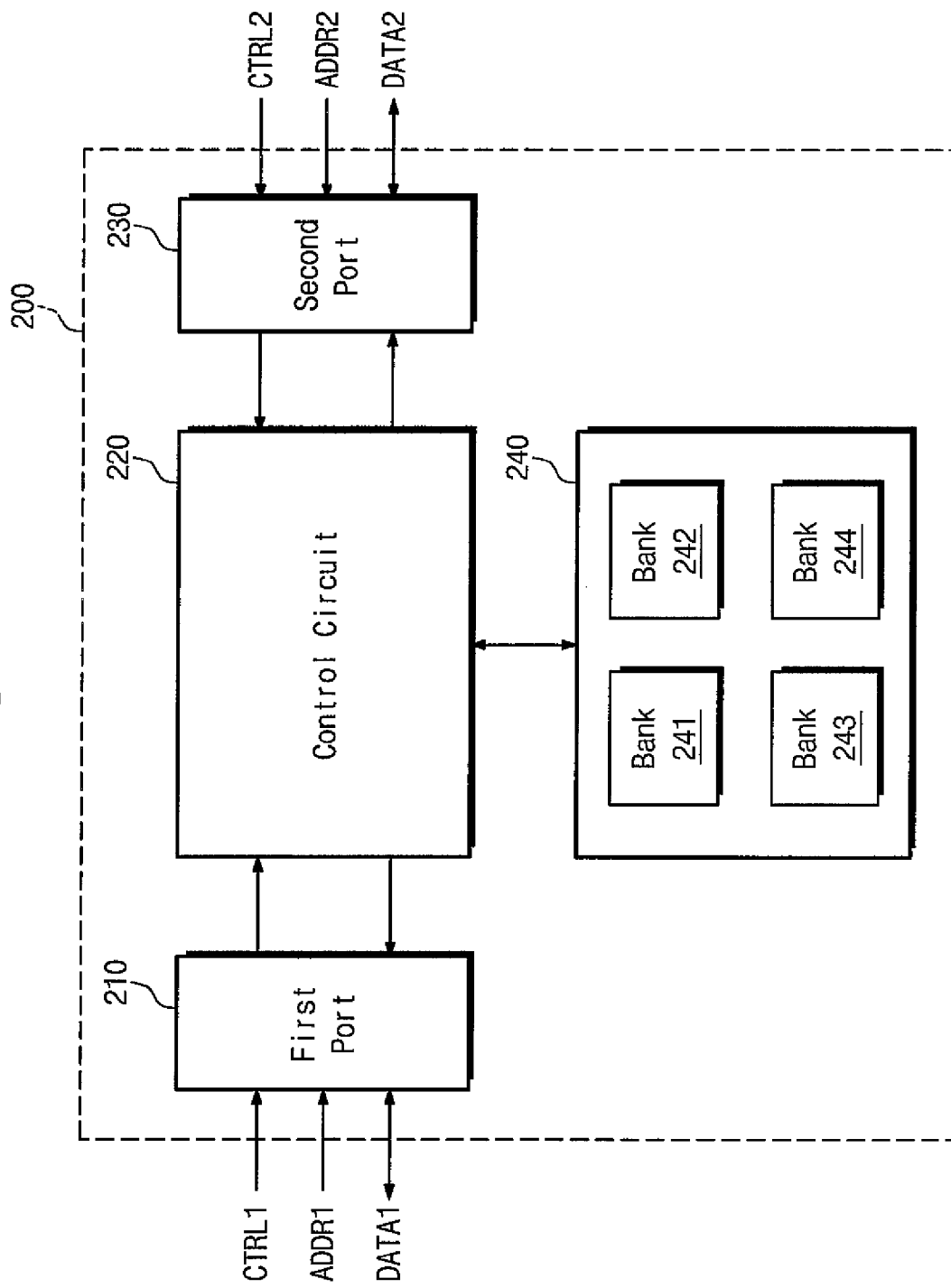
FIG. 2 is a block diagram illustrating a structure of a dual port RAM of FIG. 1.

FIG. 2 is a block diagram illustrating a structure of the dual port RAM 200 of FIG. 1 according to an embodiment of the present invention.

Referring to FIG. 2, the dual port RAM 200 of this example includes a first port 210, a control circuit 220, a second port 230, and a memory array 240. The first port 210 receives a control signal CTRL1 and an address ADDR1 from the host 100 shown in FIG. 1, and exchanges a data signal DATA1 with the host 100. The second port 230 receives a control signal CTRL2 and an address ADDR2 from the memory controller 300 shown in FIG. 1 and exchanges a data signal DATA2 with the memory controller 300 shown in FIG. 1. The control signals CTRL1 and CTRL2 inputted from the host 100 and the memory controller 300 include, for example, a chip enable signal and a read/write signal.

The control circuit 220 accesses the memory array 240 in response to the control signal CTRL1, the address ADDR1 and/or the data signal DATA1, which are input through the first port 210, and accesses the memory array 240 in response to the control signal CTRL2, the address ADDR2, and/or the data signal DATA2, which are input through the second port 230. That is, the control circuit 220 writes the data signals DATA1 and DATA2 in the memory array 240, or supplies the data signals DATA1 and DATA2 read from the memory array 240 into the first and second ports 210 and 230.

The memory array 240 includes a plurality of banks 241 to 244. Each of the banks 241 to 244 includes a plurality of memory cells arranged in a plurality of rows and a plurality of columns. A portion of any of one the banks 241 to 244 is used as a working memory region for storing temporary data of the memory controller 300. For example, a portion of a bank 244 may be utilized as a working memory region. In the case, the banks 241 to 243 and the non-working memory region of the bank 244 are accessed by the host 100, and the working memory region of the bank 244 is accessed by the memory controller 300.

Figure 3:
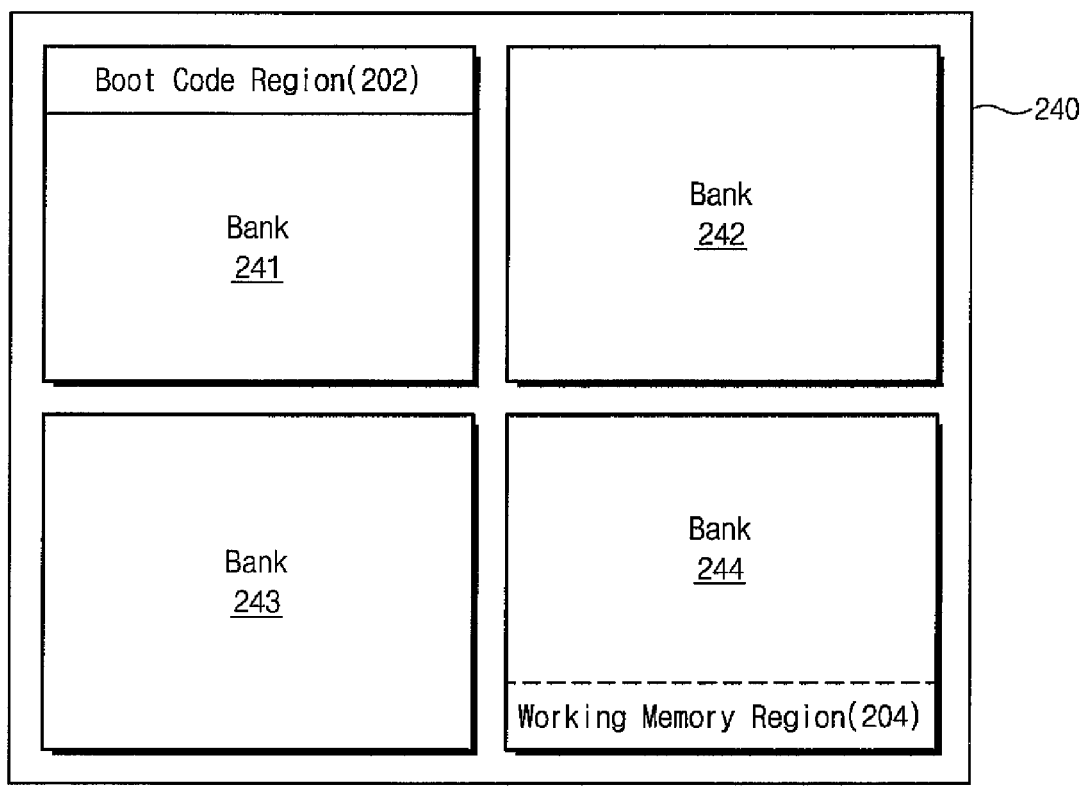
FIG. 3 is a block diagram of memory banks.

FIG. 3 is a block diagram of the memory banks 241 to 244 according to an embodiment of the present invention.

Referring to the example illustrated by FIG. 3, a portion of the bank 244 constitutes a working memory region 204. Further, the bank 241 includes a boot code region 202 for storing a boot code of the host 100. The boot code is preferably stored in a pre-defined region of the memory array 240 in order to be accessed by the host 100 during power up. Information indicative of the position and size of the working memory region 204 is stored in the non-volatile memory 320 of the memory controller 300 and in the boot code 402 of the flash memory 400 in FIG. 1.

During power up, after storing the working information, which is stored in the non-volatile memory 320, in the register 330 in the host interface 330, the processor 310 in the memory controller 300 stores temporary data in the working memory region 204 of the memory array 240, or reads the temporary data from the working memory region 204. The boot code 402 in the flash memory 400 is loaded into the boot code region 204 in the dual port RAM 200. The host 100 references information for the working memory region 204 in the boot code 402 to limit access for the working memory region 204 during a normal operational mode. In this case, the working memory region 204 can be accessed only by the memory controller 300.

Figure 4:
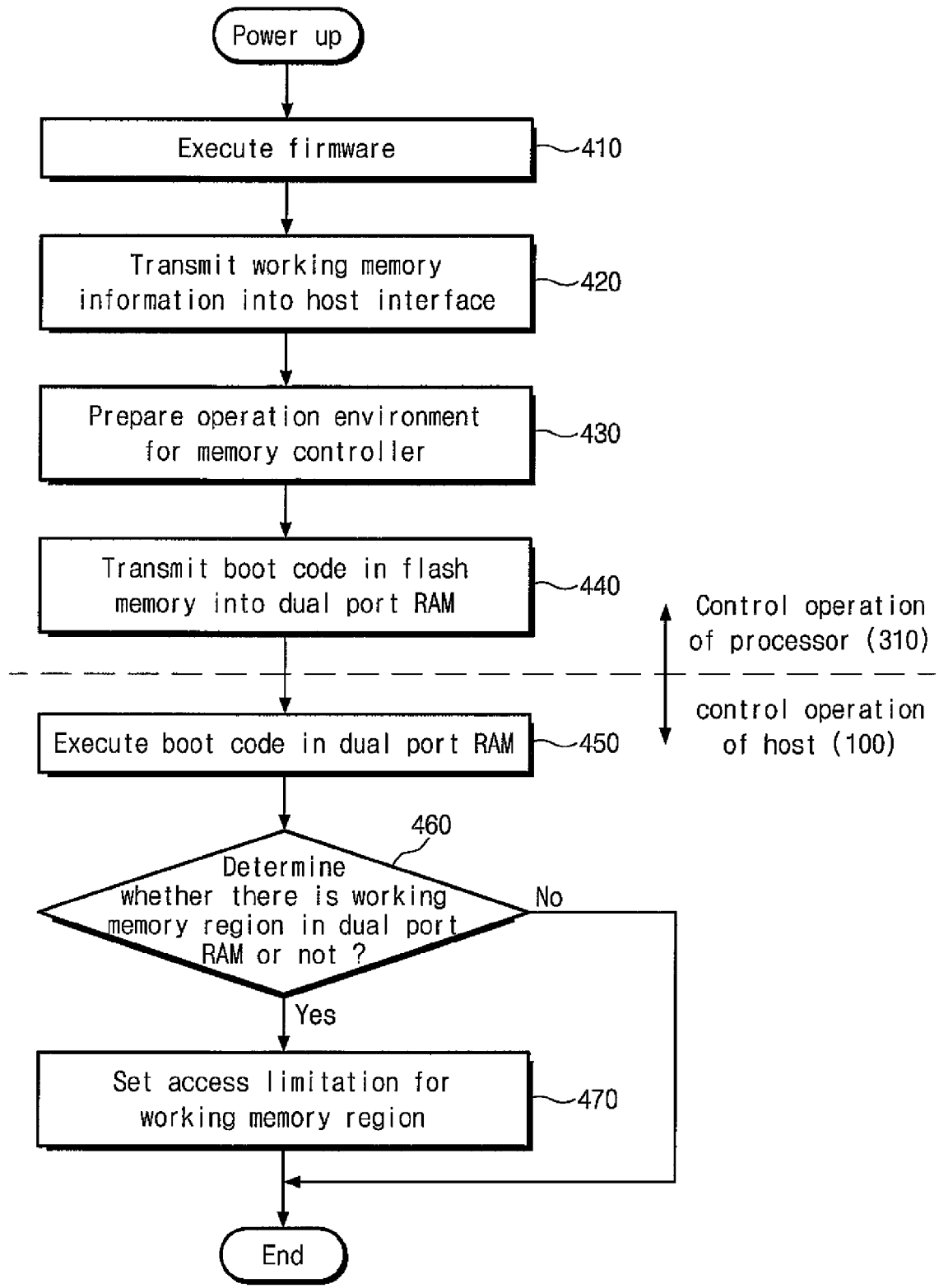
FIG. 4 is a flowchart illustrating control orders of a processor and a host in a memory controller of FIG. 1 during power up.

FIG. 4 is a flowchart for use in describing routines executed by the processor 300 and the host 100 in the memory controller 300 of FIG. 1 during a power up operation.

Referring to FIG. 4, at 410, the processor 310 in the memory controller 300 is responsive to the power up condition to execute the firmware 322 stored in the non-memory 320. The firmware 322 includes boot codes necessary for booting of the memory controller 300. According to this embodiment, the firmware 322 further includes a code for controlling the working memory information stored in the non-volatile memory 320 to be loaded into the register 332 of the host interface 330. The processor 310 reads the working memory information stored in the non-volatile memory 320 and then stores the same in the register 332 of the host interface 330 (420 of FIG. 4). The host interface 330 references the working memory information stored in the register 332 under control of the processor 310 to read/write temporary data from/into the working memory region 204 in the dual port RAM 200.

The processor 310 assumes that a general environment in which the memory controller 300 operates normally is ready once all codes necessary for booting of the memory controller 300 are executed (430 of FIG. 4). The processor 310 transmits the boot code 402, which is stored in a predetermined region of the flash memory 400, into the boot code region 202 in the dual port RAM 200 (440 of FIG. 4). According to the example of this embodiment, the boot code 402 is stored in a predetermined region of the flash memory 400. However, but the boot code 402 may be stored in other storage media, such as a hard disk drive (HDD), a CD-ROM drive, or a ROM. Regardless of where stored, the boot code 402 includes information for the working memory region 204.

The host 100 is booted by executing the boot code stored in the boot code region 202 of the dual port RAM 200 (450 of FIG. 4). If the host 100 determines that the working memory region 204 exists in the dual port RAM 200 during execution of the boot code (460 of FIG. 4), the host 100 performs a control operation in order to limit access for the working memory region 202 (470 of FIG. 4). Thus, the host 100 cannot normally access the working memory region 204. However, if necessary or desired, additional access commands can be implemented to allow the host 100 to access the working memory region 204.

According to the control routine described above, the memory controller 300 utilizes a predetermined region in the dual port RAM 200 as a working memory. Access for the working memory region 204 in the dual port RAM 200 may be limited such that the working memory region 204 is exclusively used by the memory controller 300.

A circuit structure of the memory controller 300 may be simplified by the taking advantage of the control routine described above, and a chip size thereof may be reduced. Furthermore, the size of the working memory region in the dual port RAM 200 may be readily adjusted by changing the working memory information in the non-volatile memory 320 and in the boot code 402 of the flash memory 400.

Figure 5:
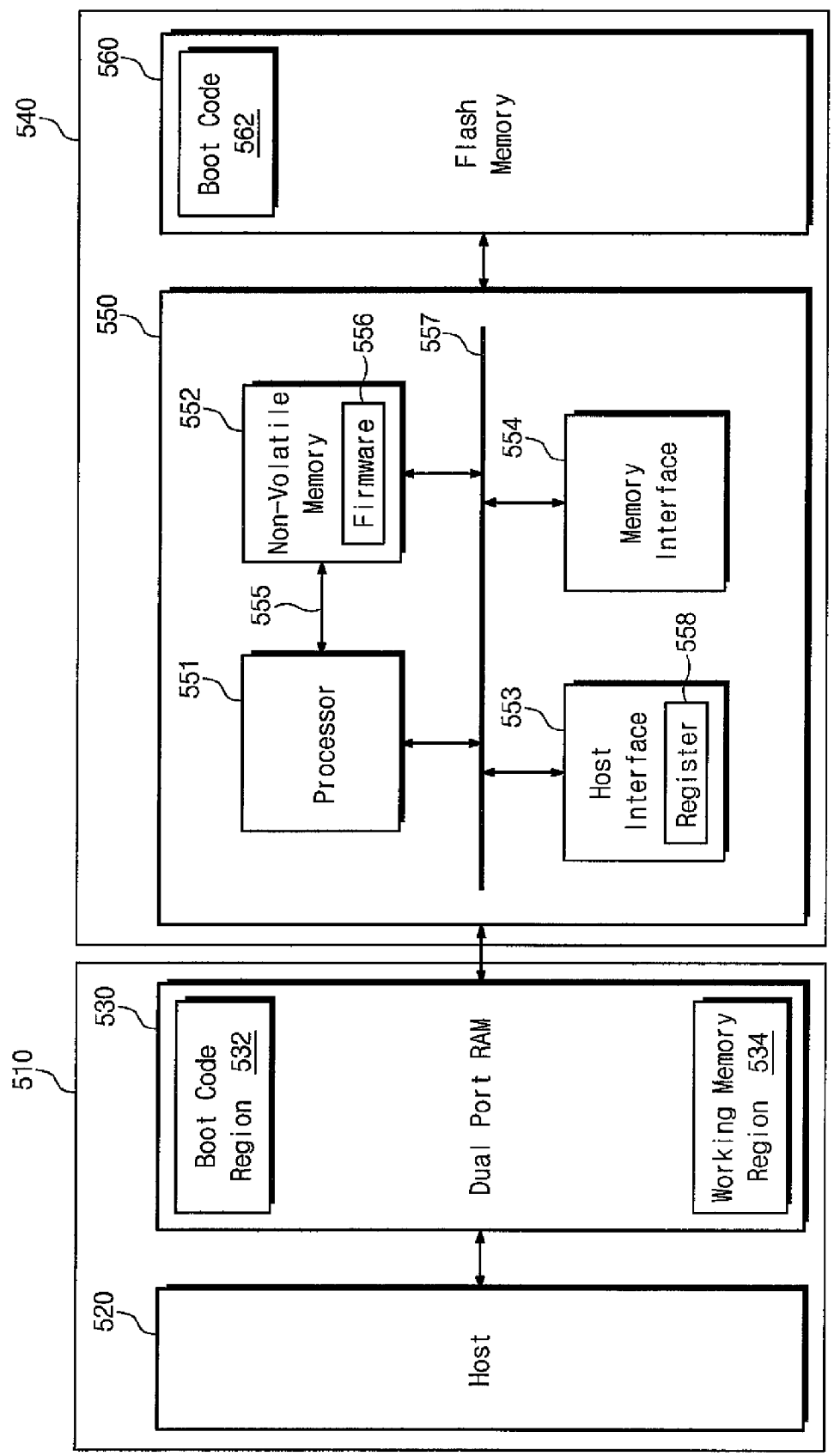
FIG. 5 is a block diagram of a memory system according to another embodiment of the present invention.

FIG. 5 is a block diagram of a memory system according to another embodiment of the present invention.

In the example of FIG. 5, a host 520 and a dual port RAM 530 are integrated into one chip or board 510, and a memory controller 550 and a flash memory 560 are integrated into one chip 540. Otherwise, the embodiment of FIG. 5 includes similar components as that of FIG. 1. That is, the dual port RAM 530 includes a boot code region 532 and a working memory region of 534. The memory controller 550 includes a bus 557, a processor 551, a non-volatile memory 552 (including firmware 556), a communication link 555, a host interface 553 (including a register 558), and a memory interface 554. The memory system of FIG. 5 operates in essentially the same manner as that of FIG. 1, and a detailed operational description of FIG. 5 is omitted here to avoid redundancy.

The memory system configuration of FIG. 5 may be advantageous in implementing the system as a compact flash card, a smart media card, a memory stick, a secure digital (SD) card, a multimedia card (MMC). As with the embodiment of FIG. 1, a portion of a memory region of the dual port RAM 510 may be utilized as a working memory region of the memory controller 550.

Figure 6:
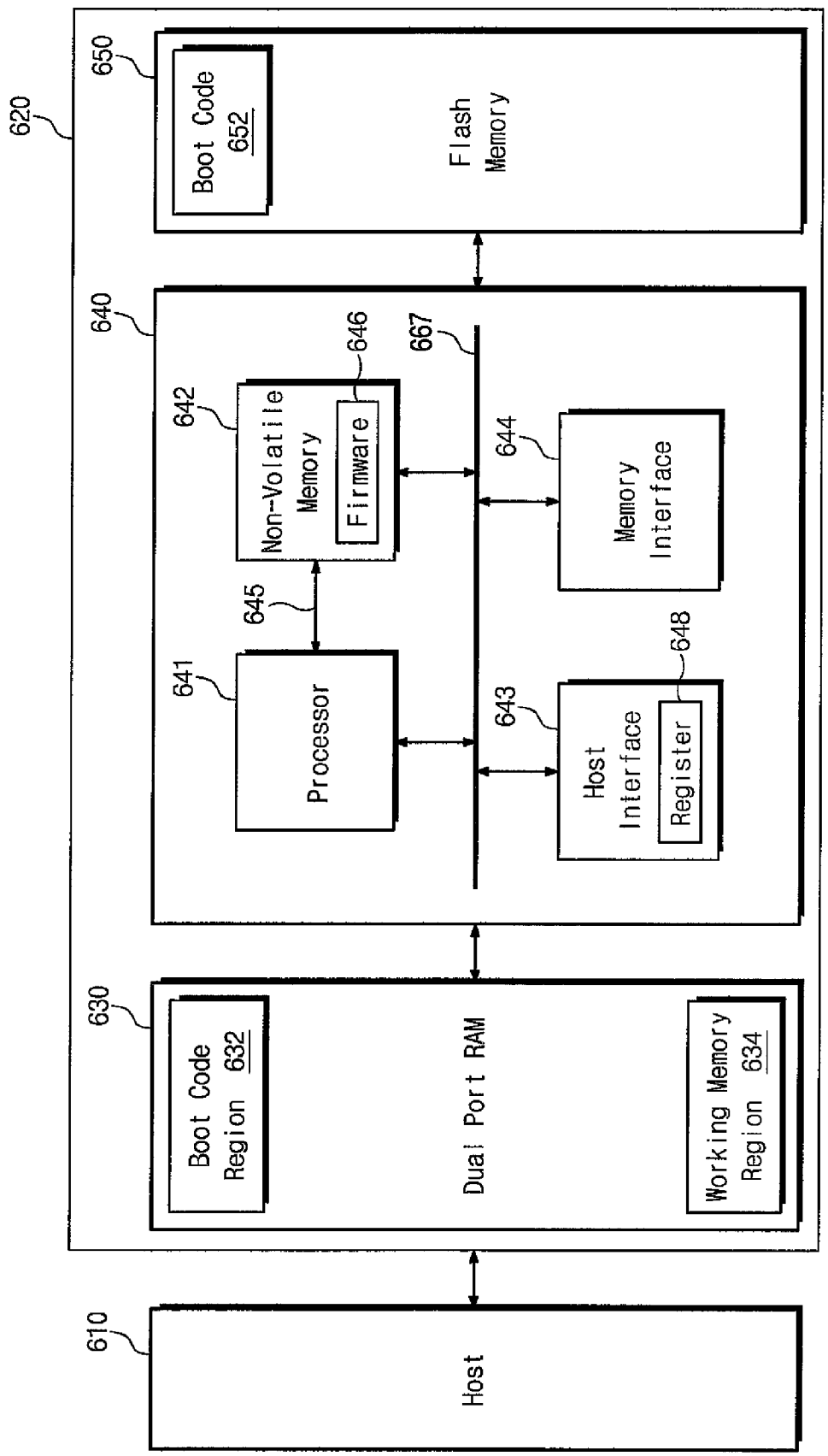
FIG. 6 is a block diagram of a memory system according to further another embodiment of the present invention.

FIG. 6 is a block diagram of a memory system according to another embodiment of the present invention.

In the example of FIG. 6, a dual port RAM 630, a memory controller 640, and a flash memory 650 are integrated into one chip 620. The memory chip 620 communicates with the host 610 through the dual port RAM 630. In this memory system, a part of a memory region of the dual port RAM 630 may be utilized as a working memory region of the memory controller 640.

The embodiment of FIG. 5 includes similar components as that of FIG. 1. That is, the dual port RAM 630 includes a boot code region 632 and a working memory region of 634. The memory controller 640 includes a bus 667, a processor 641, a non-volatile memory 642 (including firmware 646), a communication link 645, a host interface 643 (including a register 648), and a memory interface 644. The memory system of FIG. 6 operates in essentially the same manner as that of FIG. 1, and a detailed operational description of FIG. 6 is omitted here to avoid redundancy.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A memory system comprising:
a flash memory device; and
a dual port memory which exchanges data with the flash memory device,
wherein the flash memory device utilizes a portion of the dual port memory as a working memory,
wherein the dual port memory comprises a plurality of memory banks, and the working memory portion of the dual port memory is located in a part of one of the plurality of memory banks,
wherein the flash memory device comprises a flash memory, and a memory controller which interfaces between the dual port memory and the flash memory, and which accesses the working memory portion of the dual portion memory, and
wherein the memory controller comprises a non-volatile memory which stores firmware and working memory information utilized to operate the flash memory device, a processor which operates in accordance with the firmware, a first interface which interfaces with the dual port memory, and a second interface which interfaces with the flash memory.

2. The memory system of claim 1, wherein the dual port memory further comprises:
a port which communicates with the flash memory device; and
a control logic which controls access to the working memory portion of the dual port memory in response to control signals, wherein the control signals are input from the flash memory device through the port.

3. The memory system of claim 1, wherein the memory controller further comprises a bus connected to the non-volatile memory, the processor, and the first and second interfaces.

4. The memory system of claim 1, wherein the working memory information denotes a location and size of the working memory portion of the dual portion memory.

5. The memory system of claim 4, wherein the first interface comprises a register which stores the working memory information.

6. The memory system of claim 5, wherein the processor stores the working memory information, read from the non-volatile memory, in the register of the first interface.

7. The memory system of claim 6, wherein the first interface accesses the working memory portion of the dual portion memory by referencing the working memory information stored in the register.

8. The memory system of claim 1, wherein the dual port memory is a dual port RAM.

9. A memory system comprising:
a host;
a flash memory device; and
a dual port memory which exchanges data with the host and the flash memory device,
wherein the flash memory device utilizes a portion of the dual port memory as a working memory,
wherein the dual port memory comprises a plurality of memory banks, and the working memory portion of the dual port memory is located in a part of one of the plurality of memory banks, and
wherein the memory banks, excluding the working memory portion of the dual port memory, are accessible by the host.

10. The memory system of claim 9, wherein the dual port memory further comprises:
a first port which communicates with the host; and
a second port which communicates with the flash memory device.

11. The memory system of claim 10, wherein the dual port memory controls access to the memory banks excluding the working memory portion of the dual port memory in response to control signals input from the host through the first port, and
controls access to the working memory portion of the dual port memory in response to control signals input from the flash memory device through the second port.

12. The memory system of claim 9, wherein the flash memory device comprises:
a flash memory; and
a memory controller which interfaces between the dual port memory and the flash memory, and which accesses the working memory portion of the dual portion memory.

13. The memory system of claim 12, wherein the memory controller comprises:
- a non-volatile memory which stores firmware and working memory information utilized to operate the flash memory device;
- a processor which operates in accordance with the firmware;
- a first interface which interfaces with the dual port memory;
- a second interface which interfaces with the flash memory; and
- a bus connected to the non-volatile memory, the processor, and the first and second interfaces.

14. The memory system of claim 13, wherein the working memory information denotes a location and size of the working memory portion of the dual portion memory.

15. The memory system of claim 14, wherein the first interface comprises a register which stores the working memory information, wherein the processor stores the working memory information, read from the non-volatile memory, in the register of the first interface, and wherein the first interface accesses the working memory in the dual port memory by referencing the working memory information stored in the register.

16. The memory system of claim 15, wherein the flash memory stores a boot code utilized in booting operation of the host.

17. The memory system of claim 16, wherein the boot code of the flash memory is loaded into the dual port memory during a power up operation,
- wherein the boot code comprises the working memory information, and wherein the host inhibits access to the working memory portion of the dual port memory by referencing the working memory information stored in the boot code in the dual port memory.

18. The memory system of claim 12, wherein the memory controller and the flash memory are integrated onto a single chip.

19. The memory system of claim 12, wherein the memory controller, the flash memory, and the dual port memory are integrated onto a single chip.

20. The memory system of claim 9, wherein the dual port memory is a dual port RAM.

* * * * *